United States Patent
Weiser

(10) Patent No.: US 11,665,277 B2
(45) Date of Patent: May 30, 2023

(54) APPARATUS, METHODS, AND ARTICLES OF MANUFACTURE FOR FILTERING CALLS AND REDUCING SPOOFING AND SPAMMING

(71) Applicant: Anatoly S. Weiser, San Diego, CA (US)

(72) Inventor: Anatoly S. Weiser, San Diego, CA (US)

( * ) Notice: Subject to any disclaimer, the term of this patent is extended or adjusted under 35 U.S.C. 154(b) by 0 days.

(21) Appl. No.: 17/179,230

(22) Filed: Feb. 18, 2021

(65) Prior Publication Data

US 2021/0297529 A1     Sep. 23, 2021

Related U.S. Application Data

(60) Provisional application No. 62/991,909, filed on Mar. 19, 2020.

(51) Int. Cl.
    *H04M 3/00*         (2006.01)
    *H04M 5/00*         (2006.01)
    (Continued)

(52) U.S. Cl.
    CPC ........ *H04M 3/436* (2013.01); *H04L 65/1079* (2013.01); *H04L 65/1104* (2022.05);
    (Continued)

(58) Field of Classification Search
    CPC ............. H04M 3/436; H04M 3/42059; H04M 2203/105; H04M 15/8088; H04M 15/47; H04M 15/06; G06Q 20/10; G06Q 20/04; G06Q 20/40; G06Q 20/12; G06Q 20/085; G06Q 30/04; G06Q 20/042; G06Q 20/14; G06Q 20/02; G06Q 20/401; G06Q 20/0855; G06Q 20/26; G06Q 20/16;
    (Continued)

(56) References Cited

U.S. PATENT DOCUMENTS

| 7,636,756 B2 | 12/2009 | Landesmann et al. |
| 8,837,694 B1 * | 9/2014 | Kline .................... H04M 15/43 379/114.21 |

(Continued)

OTHER PUBLICATIONS

Wikipedia entry for STIR/SHAKEN, downloaded Jan. 14, 2021, all pages.

(Continued)

*Primary Examiner* — Kharye Pope
(74) *Attorney, Agent, or Firm* — Anatoly S. Weiser, Esq.; IPLCounsel

(57) ABSTRACT

Unsolicited electronic communications such as robocalls and person-initiated solicitation calls are reduced by imposing tolls for completion of the connections to the called parties, and refunding the tolls to the entities indicated by the electronic communications as the calling parties. In this way, a dishonest originator of a spoofed call bears the cost of the toll, and the toll is not refunded to the dishonest originator. On the other hand, the toll collected from an honest originator of a non-spoofed call is refunded to the honest originator, making the toll transparent to the honest originator and avoiding annoyance of the honest caller caused by the toll. Unsolicited calls may be subjected to filtering, particularly filtering based on the indications of the origins of the calls.

20 Claims, 7 Drawing Sheets

(51) Int. Cl.
*H04M 3/436* (2006.01)
*H04M 3/42* (2006.01)
*H04M 3/22* (2006.01)
*H04M 15/00* (2006.01)
*H04L 65/1076* (2022.01)
*H04L 65/1104* (2022.01)
*H04L 12/66* (2006.01)

(52) U.S. Cl.
CPC ..... *H04M 3/2281* (2013.01); *H04M 3/42059* (2013.01); *H04M 15/31* (2013.01); *H04M 15/50* (2013.01)

(58) Field of Classification Search
CPC .. G06Q 20/3676; G06Q 20/322; G06Q 20/28; H04L 2209/56; H04L 63/10; H04L 9/3213; H04L 63/0892; H04L 9/3226; H04L 67/53; H04L 65/1104; H04L 65/1079; H04L 65/1069
USPC ............. 379/114.01, 114.05, 114.22, 114.24, 379/114.25; 705/39, 40, 44, 75, 65, 77, 705/78
See application file for complete search history.

(56) References Cited

U.S. PATENT DOCUMENTS

| | | | |
|---|---|---|---|
| 9,262,751 B1* | 2/2016 | Wheeler | H04L 51/216 |
| 9,712,681 B1 | 7/2017 | Cohen et al. | |
| 10,284,719 B2 | 5/2019 | Korn | |
| 10,375,127 B2 | 8/2019 | Filart | |
| 10,455,085 B1 | 10/2019 | Roundy et al. | |
| 10,523,814 B1 | 12/2019 | Moore et al. | |
| 10,523,815 B1 | 12/2019 | Bidulock et al. | |
| 10,554,821 B1 | 2/2020 | Koster | |
| 2001/0040949 A1* | 11/2001 | Blonder | H04M 17/00 379/112.01 |
| 2002/0052754 A1* | 5/2002 | Joyce | H04Q 3/0029 705/400 |
| 2002/0065774 A1* | 5/2002 | Young | G06Q 20/322 705/41 |
| 2002/0099670 A1* | 7/2002 | Jakobsson | G06Q 30/02 705/400 |
| 2003/0229584 A1* | 12/2003 | Brown | G06Q 20/06 705/39 |
| 2004/0158540 A1 | 8/2004 | Zuo | |
| 2006/0025109 A1* | 2/2006 | Levitan | H04M 15/41 455/406 |
| 2009/0307778 A1* | 12/2009 | Mardikar | H04L 63/0861 455/406 |
| 2015/0012435 A1* | 1/2015 | Ramavarjula | G06Q 20/4016 705/44 |
| 2015/0356630 A1 | 12/2015 | Hussain | |
| 2016/0034870 A1 | 2/2016 | Howe et al. | |
| 2016/0036868 A1* | 2/2016 | Brewer | H04M 7/1275 370/352 |
| 2016/0269391 A1* | 9/2016 | Gaddam | H04L 63/0807 |
| 2017/0017916 A1* | 1/2017 | Davis | G06Q 20/102 |
| 2017/0126901 A1* | 5/2017 | Lim | H04L 12/1407 |
| 2019/0028865 A1 | 1/2019 | Raleigh et al. | |
| 2020/0053136 A1 | 2/2020 | Filart et al. | |
| 2020/0153959 A1 | 5/2020 | Scivicque | |
| 2020/0252503 A1* | 8/2020 | Li | H04L 65/1079 |
| 2020/0336314 A1* | 10/2020 | Barakat | H04L 9/3247 |
| 2021/0203700 A1* | 7/2021 | Asveren | H04L 65/1104 |

OTHER PUBLICATIONS

Wikipedia entry for Session Initiation Protocol, downloaded Jan. 27, 2021, all pages.
STIR/SHAKEN overview available online at transnexus.com/whitepapers/stir-and-shaken-overview, downloaded Jan. 13, 2021, all pages.
Wikipedia entry for Traffic Pumping, downloaded Feb. 17, 2021, all pages.
Wikipedia entry for Telephone numbers in the Dominican Republic, downloaded Feb. 17, 2021, all pages.
Premium-rate telephone number, downloaded Jan. 13, 2021, all pages.
Wikipedia entry for Premium-rate telephone number, downloaded Jan. 13, 2021, all pages.
Beware of Area Code Scams, AARP Bulletin, available at https://www.aarp.org/money/scams-fraud/info-03- 2012/area-code-scam-alert/, retrieved Jan. 13, 2021, all pages.
Premium Rate phone numbers, teleforwarding, available at https://www.teleforwarding.com/premium-rate-numbers /, retrieved on Jan. 13, 2021, all pages.
Cynthia Dwork et al., Pricing via Processing or Combatting Junk Mail, available at https://web.cs.dal.ca/~abrodsky/7301/readings/DwNa93.pdf, retrieved on Mar. 20, 2020, all pages.

* cited by examiner

APPARATUS, METHODS, AND ARTICLES OF MANUFACTURE FOR FILTERING CALLS AND REDUCING SPOOFING AND SPAMMING

CROSS-REFERENCE TO RELATED APPLICATION

This application claims priority to U.S. Provisional Patent Application Ser. No. 62/991,909, entitled APPARATUS, METHODS, AND ARTICLES OF MANUFACTURE FOR REDUCING SPOOFING AND SPAMMING, filed Mar. 19, 2020, which is hereby incorporated by reference in its entirety as if fully set forth herein, including Specification, Figures, Claims, and all other matter.

FIELD

This description relates generally to controlling the connection and delivery of electronic communications, and in particular to reducing the volume of unsolicited and spoofed calls.

BACKGROUND

With the marginal cost of sending electronic communications being effectively zero, a typical person is subjected to numerous unwanted communications, in particular, unsolicited telephone calls. This is annoying, disrupting, and time consuming. There are various ways to block telephone spam, but to do so effectively generally requires call filtering based on knowledge of the call origin, such as caller ID. Spoofing, however, defeats such filtering. "Spoofing" refers to deceptive indication of a call's origin, for example, false calling line identification (false "CLID") or false calling party name (false "CPN" or "CNAM").

A need in the art exists for improved techniques for filtering and blocking unwanted/spoofed electronic communications, particularly audio and video calls. A need in the art exists for improved techniques discouraging, preventing, and blocking unwanted/spoofed communications, particularly audio and video calls. A need in the art exists for improved techniques that impose costs on originators of unwanted/spoofed electronic communications.

SUMMARY

This document describes embodiments, variants, implementations, and examples effectuating novel techniques for addressing one or more of the needs identified above, and possibly other needs. Selected embodiments described in this document include methods, apparatus, and articles of manufacture that reduce spoofing and enable selective imposition of costs on the originators of spoofed calls.

In an embodiment, a method of processing call requests includes receiving a request to connect a call to a user device of a user, from an originator of the request. The method also includes determining whether the request contains a value token that meets all (each) of one or more acceptability requirements. The one or more acceptability requirements include a first requirement of the value token having a value of at least a predetermined toll amount, which may be pecuniary (e.g., money, financial, readily convertible into money). The method additionally includes rejecting the request if the request does not include the value token that meets all of the one or more acceptability requirements, including dropping the request. If the request contains the value token that meets all (each) of the one or more acceptability requirements, then the method includes the following steps: obtaining via a first electronic transfer the predetermined amount of the value token so that the originator of the request is not in control of the predetermined amount of the value token; crediting via a second electronic transaction at least a portion of the predetermined amount to an account associated with call origin indicated in the request (e.g., caller ID), if the request indicates the call origin; and connecting the call to enable the user to answer the call through the user device.

In aspects, the step of rejecting also includes attempting to interact with an originator of the request, for example, conveying a message to the originator of the request and recording a message from the originator of the request.

In aspects, the one or more acceptability requirements include a second requirement of the value token being of acceptable quality.

In aspects, the one or more acceptability requirements include a requirement of the value token being non-refundable.

In aspects, the method further includes filtering the request based on at least one characteristic of the request and rejecting the request if the request does not pass the step of filtering, so that the request is dropped without the call being connected to the user device. The at least one characteristic may include origin of the request, such as caller ID.

In aspects, the step of filtering is performed before or concurrently with the step of determining whether the request contains the value token that meets all of the one or more acceptability requirements.

In aspects, the step of filtering is performed after or concurrently with the step of determining whether the request contains the value token that meets all of the one or more acceptability requirements.

In aspects, the method further includes maintaining a list of call origins (e.g., telephone numbers) from which call requests are not to be connected.

In aspects, the step of filtering includes determining whether the origin of the request is included on the list.

In aspects, the request does not pass the step of filtering if the origin of the request is on the list (e.g., the origin is blacklisted).

In aspects, the step of filtering the request passes the step of filtering if the origin of the request is on the list (e.g., the origin is whitelisted).

In aspects, the request comprises a Session Initiation Protocol (SIP) INVITE, and the step of filtering includes attempting to extract a STIR/SHAKEN attestation from the SIP INVITE, and the filtering is based on presence or absence of the attestation in the SIP INVITE, and/or level of the attestation (e.g., Full Attestation. Partial Attestation. Gateway Attestation, no attestation). The step of filtering may be performed after the steps of obtaining the predetermined amount and crediting.

In an embodiment, a method of processing call requests includes receiving a request to connect a call to an "extra cost telephone number" of a user device of a user, from an originator of the request. The method also includes connecting the call to enable the user to answer the call through the user device. The method additionally includes determining the extra cost of the call incurred by the originator (or a related party) due to the extra cost telephone number of the user device, extracting caller origin indicated in the request (such as caller ID), and crediting via an electronic transaction at least a portion of the extra cost of the call to an account associated with the call origin indicated in the request. The extra cost telephone number may be, for example, a premium-rate telephone number, a non-U.S. North American Numbering Plan (NANP) telephone number, or a traffic pumping number.

In aspects, the method further includes filtering the request based on at least one characteristic of the request, and dropping the request if the request does not pass the step of filtering so that the request is dropped without the call being connected to the user device.

In aspects the request includes a Session Initiation Protocol (SIP) INVITE. The SIP INVITE may have an identity header that has a calling number field and a STIR/SHAKEN attestation field. The step of filtering includes attempting to extract an attestation from the STIR/SHAKEN attestation field and a calling number from the calling number field. The step of filtering may be based, in whole or in part, on the level of the attestation.

In aspects, the request fails the step of filtering if the attestation is not a STIR/SHAKEN Full Attestation, or one of Full Attestation and Partial Attestation.

In an embodiment, a method of processing call requests includes receiving a SIP INVITE request to connect a call to a user device of a user, from an originator of the request. The method also includes determining whether the request contains an acceptable STIR/SHAKEN attestation. If the request contains an acceptable STIR/SHAKEN attestation (e.g., Full Attestation and/or Partial Attestation), the request is filtered based on at least one characteristic of the request, such as a caller ID. If the request passes the filtering, the call is connected to enable the user to answer the call through the user device. If the request fails the filtering, the request is rejected. If the request does not contain an acceptable STIR/SHAKEN attestation, a determination is made whether the request includes a value token that meets all of one or more acceptability requirements, including having a value of at least a predetermined toll amount. If the request does not contain an acceptable STIR/SHAKEN attestation and the request does not include a value token that meets all of the one or more acceptability requirements, the request is rejected. If the request does not contain an acceptable STIR/SHAKEN attestation but does include a value token that meets all of the one or more acceptability requirements, then the following steps are performed:

obtaining via a first electronic transaction (transfer of value) the predetermined amount of the value token so that the originator of the request is not in control of the predetermined amount of the value token, crediting via a second electronic transaction (transfer of value) at least a portion of the predetermined amount to an account associated with call origin indicated in the request, if the request indicates the call origin, and connecting the call to enable the user to answer the call through the user device.

In aspects, the call is a telephone call; only Full Attestation is acceptable; and the rejection of the request includes (i) conveying a message to the originator of the request, (ii) recording a message from the originator of the request, and (iii) dropping the request.

These and other features and aspects of the present description will be better understood with reference to the following description, drawings, and the appended claims.

DETAILED DESCRIPTION

Figure 1:
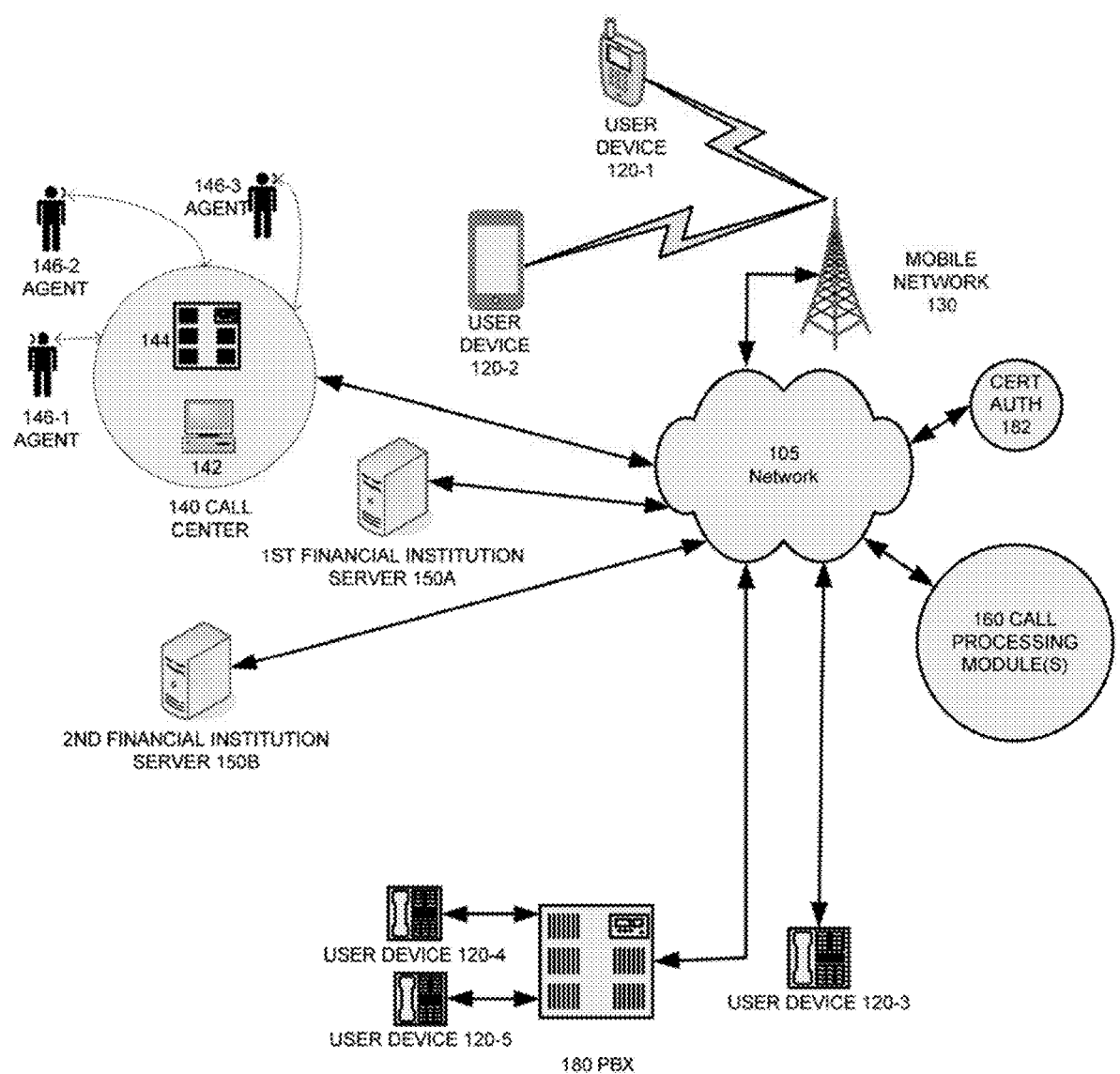
FIG. 1 illustrates selected systems of a combination that includes processing modules configured to discourage, prevent, and/or block unwanted/spoofed communications, in accordance with certain features described in this document.

The words "embodiment," "variant," "example," "implementation," and similar words and expressions as used in this document refer to a particular apparatus, process/method, or article of manufacture, and not necessarily to the same apparatus, process/method, or article of manufacture. Thus, "one embodiment" (or a similar word/expression) used in one place or context may refer to a particular apparatus, process/method, or article of manufacture; the same or a similar word/expression in a different place or context may refer to a different apparatus, process/method, or article of manufacture. The expression "alternative embodiment" and similar words and phrases may be used to indicate one of a number of different possible embodiments, variants, examples, or implementations. The number of possible embodiments, variants, examples or implementations is not necessarily limited to two or any other quantity. Characterization of an item as "exemplary" means that the item is used as an example. Such characterization does not necessarily mean that the embodiment, variant, example, or implementation is a preferred one; the embodiment, variant, example, or implementation may but need not be a currently-preferred embodiment, variant, example, or implementation. All embodiments, variants, examples, and implementations are described for illustration purposes and are not necessarily strictly limiting.

The words "couple," "connect," and similar words/phrases/expressions with their inflectional morphemes do not necessarily import an immediate or direct connection, but include within their meaning connections through mediate elements, components, and devices. Unless otherwise noted or is clear from the context, devices may be coupled/connected wirelessly, optically, in a conventional wired manner, or otherwise.

The words/phrases/expressions "processing logic," "logic," "processing module," "module" and analogous words/phrases/expressions should be understood as selected steps/decision blocks and/or hardware/software/firmware for implementing the selected steps/decision blocks. "Decision block" means a step in which a decision is made based on some condition, and subsequent process flow is directed based on whether the condition is met or not met.

An "entity" may be a person, a business entity, or another organization.

"Extra cost telephone number" signifies a telephone number that, when called, results in charges in excess of typical charges for calling a typical North American telephone number in the U.S. The charges may be toll charges imposed on the caller, directly or indirectly (e.g., through the caller's carrier/service provider). As is explained in context, below, extra cost telephone numbers include premium-rate telephone numbers such as area code 900 numbers; telephone numbers with North American Numbering Plan ("NANP") area codes that subject the call originator to fees, such as 284 (Jamaica), 809 (the Dominican Republic), and 876 (British Virgin Island) telephone area codes; and "traffic pumping" exchange numbers with substantially higher than usual access fees.

Other and further definitions and clarifications of definitions may be found throughout this document.

Reference will now be made in detail to several embodiments and to the drawings accompanying this document, which drawings are part of the description. Same reference numerals are used in the drawings and in this document to refer to the same apparatus elements and method steps. The drawings are in a simplified form, not to scale, and omit certain apparatus elements and method steps that can be added to the described apparatus and methods; while certain optional elements and steps may be included in the drawings.

FIG. 1 illustrates selected components of an exemplary combination 100. Certain of the systems and devices of the combination 100 are configured to execute some or all of the steps of the methods for reducing spoofing and/or spamming that are described in this document and illustrated in the remaining Figures.

A network 105 connects various telephone and/or other audio/video/multimedia calls between the devices of call originators and user devices of call targets. The network 105 may be a combination of different networks and different carriers-service providers, and may include a public switched telephone network ("PSTN") a k a Plain Old Telephone Service ("POTS") network; Voice over Internet Protocol ("VoIP") networks which may implement, for example, Session Initiation Protocol connections; the Internet; various Local and Wide Area Networks ("LANs" and "WANs"); wireless networks such as cellular radio access networks with their Mobile Switching Center(s), Base Station(s), Access Point(s). Node(s) B, eNodeB(s), gNodeB(s), Mobile Switching Center(s), and other mobile network devices; other networks; and combinations of networks. The network 105 may include switches of multiple carriers, including VoIP and VoIP/LTE ("VoLTE") switches, Mobile Switching Center ("MSC") node(s), international and other gateway switches, and still other equipment.

A wireless network 130 may be considered part of the network 105, or a separate network. User devices 120-1 through 120-4 are connected to the network 105, through which calls are routed to/from the user devices 120. The user devices 120 may be wireless telephones (e.g., cellphone user devices 120-1 and 120-2 connected to the wireless network 130) and other mobile devices such as tablets; wireline telephones connected to the PSTN/POTS (e.g., a wireline user device 120-3); wireline telephones connected to the network through some other equipment (e.g., wireline user devices 120-4/120-5 connected through a PBX 180); as well as other kinds of user devices, including computers, tablets, smartwatches and other wearable devices, connected vehicles, and internet of Things ("IoT") devices. Note that here the user device 120-2 may be a smartphone or another interconnected smart device capable of executing various apps (software applications, sets of machine-executable instructions making up software modules), such as Android and iOS apps, that may configure the user device 120-2 to perform some or all of the steps of the methods described in this document and illustrated in the remaining Figures.

In embodiments, some or all VoIP and VoIP/LTE switches (which may be collectively referred to as "VoIP" switches) of the networks shown in FIG. 1 implement Session Initiation Protocol ("SIP"), as well as Signature-based Handling of Asserted information using toKEN ("SHAKEN") and Secure Telephony Identity Revisited ("STIR") suite of protocols and procedures. The STIR and SHAKEN protocols and procedures may be referred to by the "STIR/SHAKEN" and "SHAKEN/STIR" monikers. The following documents may be of interest to a person seeking more information regarding SIP and STIR/SHAKEN:

Wikipedia entry for STIR/SHAKEN, downloaded Jan. 14, 2021, which is filed together or substantially together with this document and incorporated by reference in its entirety as if fully set forth herein;

Wikipedia entry for Session Initiation Protocol, downloaded Jan. 27, 2021, which is filed together or substantially together with this document and incorporated by reference in its entirety as if fully set forth herein;

STIR/SHAKEN overview available online at transnexus dot com/whitepapers/stir-and-shaken-overview, downloaded Jan. 13, 2021, which is filed together or substantially together with this document and incorporated by reference in its entirety as if fully set forth herein;

Koster, U.S. Pat. No. 10,554,821 ("Koster"), which is incorporated by reference in its entirety as if fully set forth herein;

Filart et al., U.S. Patent Application Publication Number 2020/0053136, which is incorporated by reference in its entirety as if fully set forth herein; and Barakat el al., U.S. Patent Application Publication Number 2020/0336314, which is incorporated by reference in its entirety as if fully set forth herein.

Briefly, the SIP signaling protocol may be used for initiating, maintaining, and terminating communication sessions that may include real-time voice and video sessions, as well as other messaging and multimedia applications. In particular, the SIP signaling protocol is used for signaling and controlling multimedia communication sessions in voice and video Internet telephony, including in private IP telephone systems, instant messaging, and mobile phone calling over VoLTE.

In a STIR/SHAKEN framework, a digital certificate is added to the SIP information that is used to initiate and route telephone calls in VoIP systems. The first public connection on the system, which may be a VoIP service provider or a gateway, compares the caller II) information of the call to a list of known caller IDs that the service provider provisions for its customers, and attaches an encrypted certificate to the SIP header with the service provider's identity and a trust value or attestation level parameter. Note that in embodiments described in this document, multiple hierarchic attestation levels in order of trustworthiness may be available (e.g., 1, 2, 3, etc.); and also or instead, multiple qualitative attestation levels may be available (e.g., A, B, C, etc.) for expressing qualitative aspects of trustworthiness, where different qualitative levels may be preferred (indicate relatively better or worse trustworthiness) depending on circumstances and systems involved. In the STIR/SHAKEN framework, three attestation levels, in decreasing order of reliability/desirability are Full Attestation. Partial Attestation, and Gateway Attestation. Full Attestation signifies that the service provider (of the caller) recognizes the entire phone number and the number is registered with the originating subscriber/caller; Partial Attestation signifies that that the call originated with a known customer of the service provider but the entire number has not been verified; and Gateway Attestation signifies that the call can only be verified as coming from a known gateway, for instance, a connection to another service provider, an international gateway, or another type of gateway.

The VoIP terminating service provider on the receiving end of the call may check the authenticity of the message by decrypting STIR (e.g., the SIP) using the public key of the first public connection or the caller's carrier, and thus can verify the origin of the SIP and examine the attestation level assigned by the first public connection service provider. The call may be connected to the target device, or otherwise processed, which actions may be based on the attestation level. A trusted Certificate Authority or Certificate Repository is in charge of the public/private keys used for encryption.

In non-VoIP systems, which may include certain cellular and landline systems, call routing information may be carried by Signaling System No. 7 ("SS7"). Here, the SIP header might not be sent to the target because the target is on a VoIP call connection, and therefore attestation level is unavailable, making it difficult or impossible to distinguish such calls from spoofed calls. The SHAKEN protocols indicate how to deal with such calls with incorrect or missing authenticating STIR information.

Continuing now with the description of FIG. 1, reference numeral 140 designates a call center connected to the network 105 and configured to place calls through the network 105. The call center 140 includes computing equipment 142, switching equipment 144, and agent-user communication devices (such as telephones/computers 146-1 through 146-3) connected to the computing equipment 142 and the switching equipment 144. The agents at their respective user devices 146-n may call various target user devices (e.g., user devices 120-n) through the call center 140. The call center 140 may also be able to make automated robocalls to the user devices 120-n, and then possibly connect responsive callees to the available agents (e.g., the agents 146-n) and/or provide automated information/solicitations to the user devices 120-n and/or receive input (e.g., voice/audio, DTMF, other input) from the user devices 120-n.

FIG. 1 also shows financial institution servers (or other financial institution computing systems) 150A and 150B, which are connected to the network 105 and through the network to various other devices such as additional financial institution computing systems, the call center 140 and its computing and switching equipment 142/144, the PBX 180, and the user devices 120-n. The financial institution servers 150A/150B may be operated to cause payment of tolls/charges for connecting the calls from originating devices (e.g., the agent communication devices 146-n), and refund of the tolls (in whole or in part) to accounts of the originating devices such as accounts of the call center 140, accounts of other originating devices such as the user devices 120-3/120-4, and to other accounts such as accounts associated with telephone numbers spoofed by the call center 140 and/or similar malefactors.

FIG. 1 additionally shows call processing modules 160 connected to the network 105. The call processing modules 160 may implement the call processing functionality described in this document and illustrated in the drawings. In embodiments, however, the described call processing functionality may reside in the network 105 itself (including the mobile network 130); in the user devices 120-n; in the PBX 180; in a combination of several of these systems; and elsewhere. In embodiments, the call processing functionality may be distributed between or among the systems illustrated and/or other systems. For example, the functionality may be distributed between the smartphone 120-2 and the network 105; between the smartphone 120-2 and the mobile network 130; between the smartphone 120-2 and the call processing modules 160; between the user device 120-4 and the network 105; between the user device 120-4 and the PBX 180. Further, the call processing functionality may be divided into more than two parts, whether physical or logical/conceptual. These are some of the examples of the placement and distribution of the call processing functionality described in this document.

In operation of selected embodiments, the call processing modules 160 process the calls directed to some or all of the user devices 120-n to impose a toll charge for connecting a particular call or advancing the call to another step of the call routing process, and refunding all or part of the toll to an entity that is indicated as the originating entity of the call. Thus, a cost is imposed on the entity that originates the call, and refunded to the entity that is indicated as the originating entity of the call. For "honest" (non-spoofed or spoofed-but-authorized) calls, the toll and the refund may cancel (or offset) each other and thus the charges may be transparent to the persons placing the honest calls. (In this way, the honest callers might not be annoyed by the toll charges.) For a dishonest call, however, the toll is imposed on the "dishonest" originating entity and refunded to a different entity, so that the originating entity may bear the cost of making the dishonest call. If the cost imposed is pecuniary, it may be (but not required to be) quite small, e.g., less than $1, less than $0.10, less than $0.01 (per call connection or minute).

(Authorized spoofing mentioned in the immediately preceding paragraph refers to caller ID that shows a phone number different from the number of the originating device but authorized by the entity controlling the number shown in the caller ID. This may be the case, for example, when the calls originating from the user devices 146 show a number of the call center 140. Authorized spoofing is described in Koster.)

A trusted Certificate Authority 182 is connected to the VoIP servers of the service providers (e.g., the first public connection and the VoIP terminating service provider) through the network 105 or other connections and devices.

Figure 2:
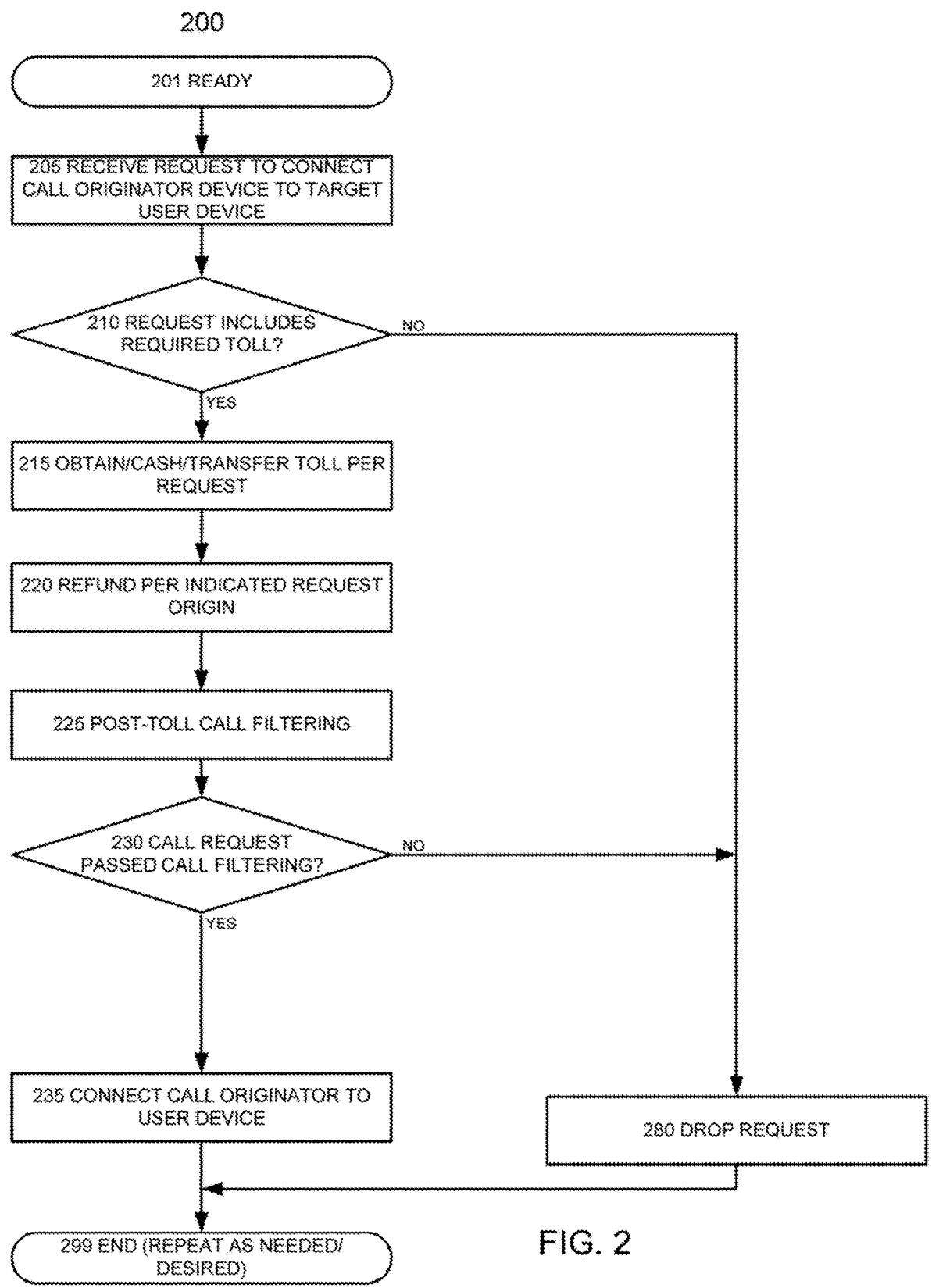
FIG. 2 illustrates selected steps and decision blocks of an exemplary method of call processing, in accordance with certain features described in this document.

FIG. 2 illustrates selected steps and decision blocks of an exemplary method 200 of operation of the call processing functionality, however the processing module(s) implementing the functionality are distributed and wherever they are located.

At flow point 201, the call processing modules and the network (e.g., the network 105) are powered-up, initialized, and ready to perform the steps of the method 200.

In step 205, a request to connect a call from an originating device (e.g., 146-n) to a target user device (the "target," e.g., 120-n) is received. The request may be, for example, a telephone call or a video or voice call via a conferencing service such as FaceTime® and WhatsApp®. (Note that conferencing here does not require more than two participants.) The request may be a SIP INVITE, within or without the STIR/SHAKEN framework. A SIP INVITE message is a request to initiate an audio/video call, which may lead to exchange of additional messages setting up the call. Within the STIR/SHAKEN framework, the request may include (but is not required to have) an attestation parameter that indicates the known identity of the SIP INVITE originator.

The SIP INVITE may carry the attestation parameter, for example, in the P-Asserted-Identity field of its header.

The request may also include a field for inclusion of a value token to pay a toll for connecting the call. The information in the value token may include data needed to transfer some predetermined amount for paying a toll for connecting the call. The token may be a cryptocurrency payment authorization, for example, an authorization to transfer Bitcoin. Bitcoin Cash, Bitcoin SV, Bitcoin Diamond, Bitcoin Gold, Ethereum, XRP, Tether, Litecoin, EOS, Binance Coin, Tezos, and other cryptocurrencies. The token may be an authorization to charge an existing deposit or credit account associated with the originator (e.g., the operator of the call center 140), with all the information sufficient to transfer the funds covering the toll (such as account number, expiration date, routing number, PIN, etc.); the account may be maintained, for example, by an operator of the network, by an external financial institution such as institutions operating the servers 150A/150B, and by an operator that provides the call processing functionality (e.g., the telephone carrier that services the target, a provider of an electronic communication app within which the call is routed such as WhatApp®, Facetime®, and analogous services, etc.). In examples, the token does not depend on the identity of the originator; in other words, the token in a spoofed call request causes or authorizes a charge to an actual account of the originator or someone authorizing the originator to use the account. Thus, the token may be from a trusted source of funds, and may be completely non-refundable or non-refundable in routine circumstances such as when the account is not reported as stolen/breached/hacked within a short period following the receipt of the token. The short period may be, for example, less than 1 minute, less than 5 minutes, less than 15 minutes, less than 30 minutes, less than 1 hour, less than 12 hours, less than 1 day; in examples, longer periods may also be considered sufficiently short for the token to be considered non-refundable in routine circumstances. Information verifying the account theft/breach/hacking may be required for refunding a token that is non-refundable in routine circumstances.

In examples, the token may be refundable but a refund may require some action to be taken by a responsible entity. For example, if a service provider (carrier) of the originator bills the originator for the call on behalf of the target's service provider, the refund may depend on presentation of facts supporting a request for a refund, such as a statement proffered by a natural person with knowledge of the facts, made to the originator's service provider and forwarded to the target's service provider. Such refundable payments impose a non-pecuniary cost on the originator and/or the originator's service provider, and thus discourage spoofed calls. Further, an arrangement may be set up to impose a cost (pecuniary, non-pecuniary, both) by making the target's telephone number a premium-rate telephone number (such as area code 900 number); a telephone number with a North American Numbering Plan area code that subjects the call originator to fees ("foreign NANP area code"), such as 284 (Jamaica), 809 (the Dominican Republic), 876 (British Virgin Island) telephone area codes; or a "traffic pumping" exchange number with substantially higher than usual access fees. The following Wikipedia entries are filed together or substantially together with this document and are incorporated by reference in their entireties as if fully set forth herein: (1) Premium-rate telephone number, downloaded Jan. 13, 2021; (2) Traffic Pumping, downloaded Feb. 17, 2021; and (3) Telephone numbers in the Dominican Republic, downloaded Feb. 17, 2021.

The token may also be an authorization to transfer a cryptocurrency payment, which may be a known type of cryptocurrency payment or a "specialized" cryptocurrency or blockchain-based value item designed for toll payments. For example, a blockchain-based value transfer system may be designed for fast processing ("fast processing" in the context of real-time call connection, e.g., <10 seconds, <5 seconds, <3 seconds, <2 seconds, <1 second). The number of authorized or required "peer" computers in the blockchain-based value transfer system may be limited to a relatively-small number, for example, fewer than 500 computers; fewer than 100 computers; or fewer than 30 computers. In examples, the blocks of the blockchain-based value transfer system may be periodically cleared of "old" transactions, such as transactions older than 30 days, six months, one year, or three years.

In decision block 210, a determination is made whether the request includes the token/toll in at least the required (predetermined) amount. The amount may be quite small, for example, equivalent to about one US cent, a few cents, a fraction of a cent, and may be in any currency, including cryptocurrency. If the token is not included, or is in insufficient amount, or is qualitatively unacceptable (e.g., easily refundable, from a non-participating or blacklisted financial institution), the method flow continues to step 280, in which the request may be dropped (the call is not connected or is disconnected). The step 280 may be referred to as rejecting the request. The method may then terminate in flow point 299, and may be repeated as needed or desired, for example, when a new request is received.

(Note that in the methods described throughout this document, multiple call requests may also be processed concurrently or in a pipelined manner.)

If the token is included, is in a sufficient amount, and is qualitatively acceptable, the method flow proceeds to step 215. In this step, the token is "cashed" in at least the required amount. For example, the funds are transferred into control of the operator/provider of the network, the operator of the service providing the call processing functionality, and/or the account associated with the target. Alternatively, if the token need not be "cashed" for some reason (e.g., a trusted party is known to be responsible for the token), this step may be omitted.

In step 220, the toll is refunded in whole or in part to an account associated with the call origin indicated in the request. For a telephone call, for example, the caller ID number may be used to identify the origin of the call. For a conferencing service (e.g., FaceTime®, WhatsApp®), the operator of the service may maintain financial accounts for the registered originators. As noted above, the charge may be made against, and the refund may be made into, the same account when the call is non-spoofed, so the toll charge may be transparent to the originator (if it is in the same amount as the refund); but for a spoofed call, the charge is made against the dishonest originator, and refunded to an account of a different entity. The funds for the refund may be taken from the same account as was used for depositing the "cashed" amount in the step 215. In this way, even a small toll charge may discourage robocalls and other unwanted calls, especially high volume calls, while being practically transparent to the honest call originators and not creating bad feelings between honest callers and their callees. The refund may be made in substantially real time, such as within <10 minutes of the call's completion. But in some embodiments the refund may take longer; preferably, however, the refund is made so that the extra cost of the call is transparent to the caller because the refund offsets (at least partially) the toll.

In step 225, call filtering may be performed. For example, calls from blacklisted originators are identified. Similarly, calls with other undesirable attributes may be identified, for example, calls from specific countries, specific area codes and exchanges; and SIP INVITEs without an attestation or with an attestation level not meeting predetermined criteria. See also Cohen et al., U.S. Pat. No. 9,712,681; Korn, U.S. Pat. No. 10,284,719; Moore et al., U.S. Pat. No. 10,523,814; and Bidulock et al., U.S. Pat. No. 10,523,815, for examples of identifying/filtering of unwanted calls. The disclosures of the patents listed in this paragraph (the "incorporated filtering patents") are incorporated by reference as fully set forth herein, including specifications, claims, figures, abstracts, and all other matter.

In decision block 230, further method flow is determined based on whether the request has been identified in the filtering step 225 as an undesirable one, for example, from a blacklisted number, not from a whitelisted number, from a number with undesirable attributes such as area code/exchange/country, without an attestation, and/or without an attestation meeting the predetermined criteria. If the request is undesirable, the method flow proceeds to the step 280 where the request is dropped, as has been described above. The originator may also be offered an opportunity to record a voice message or send a text message for the target or another entity. The method may then terminate in the flow point 299, and may be repeated as needed or desired, for example, when a new request is received.

If the request has not being identified as an undesirable one in the step 225 and the decision block 230, the method flow continues towards step 235, in which the call is connected to the target of the request (the user device being called). The method may then terminate in the flow point 299, and may be repeated as needed or desired, for example, when a new request is received.

Figure 3:
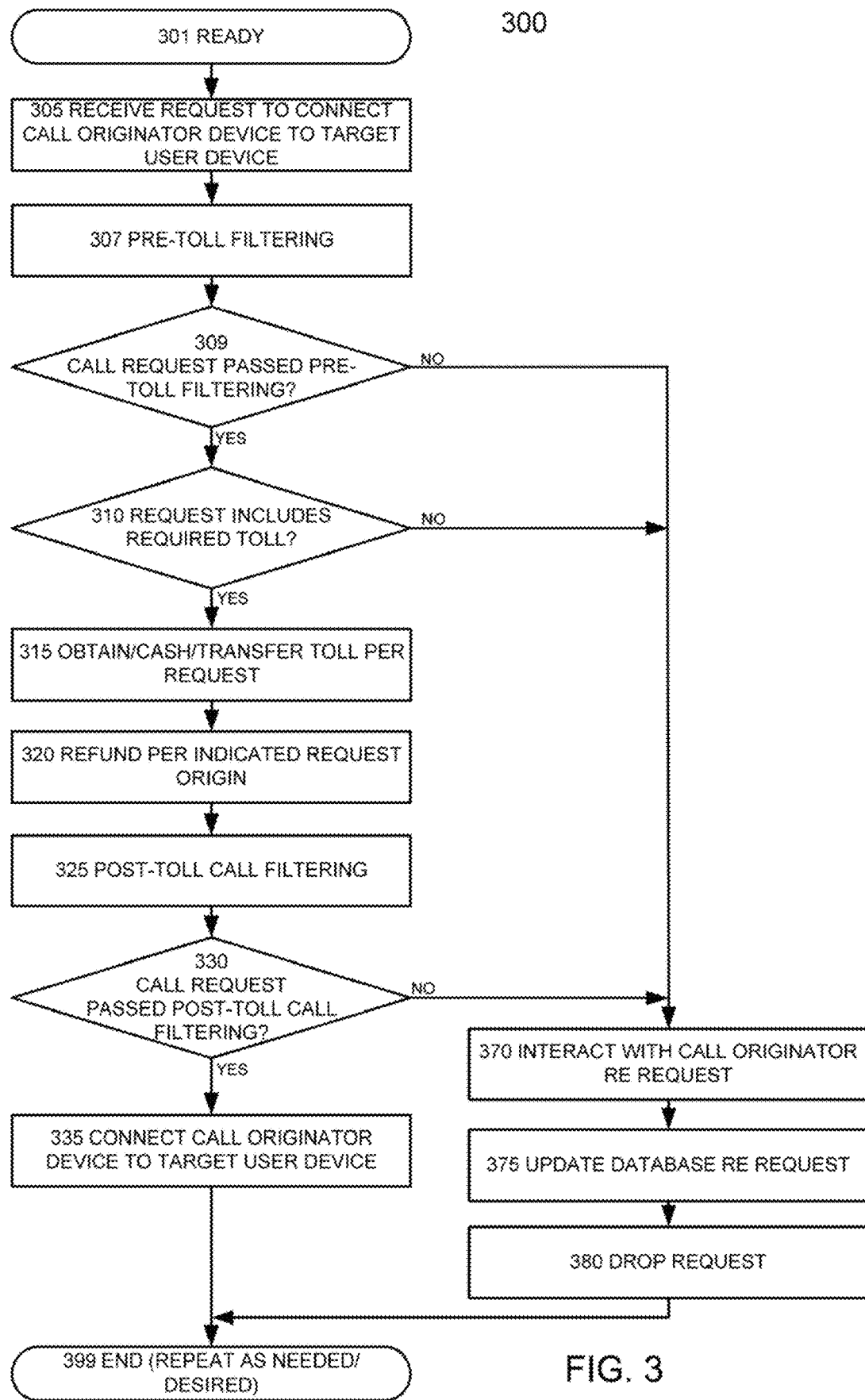
FIG. 3 illustrates selected steps and decision blocks of another exemplary method of call processing, in accordance with certain features described in this document.

FIG. 3 illustrates selected steps and decision blocks of another exemplary method 300 of operation of the call processing functionality, however the processing module(s) implementing the functionality are distributed and wherever they are located.

At flow point 301, the call processing modules and the network (e.g., the network 105) are powered-up, initialized, and ready to perform the steps of the method 300.

In step 305, a request to connect a call from the call originator (e.g., 146-$n$) to a target (e.g., 120-$n$) is received. In examples, this step is identical, analogous, or similar to the step 205 described in relation to the method 200 of FIG. 2 (and vice versa, meaning here and throughout that the description of the steps of this process may also apply to the corresponding to step or steps of the earlier-described processes).

In step 307, call filtering may be performed. For example, calls from blacklisted and/or whitelisted originators are identified. Similarly, calls with other undesirable attributes may be identified, such as calls from specific countries, specific area codes and exchanges; and SIP INVITEs without an attestation or with an attestation level not meeting predetermined criteria. See also the incorporated filtering patents for examples of identifying/filtering of unwanted calls. This step may be identical, similar, or analogous to the step 225 described above in relation to the method 200, and vice versa.

In decision block 309, further method flow is determined based on whether the request has been identified in the filtering step 307 as an unwanted one. If the request is unwanted, the method flow proceeds to step 370, where some interaction(s) between the originator and the processing modules may take place. For example, the originator may be informed (e.g., by voice/text) that the target will not answer the call. Other information may also be conveyed to the originator. The originator may additionally or instead be offered an opportunity to record a voice message or send a text message to the target or another entity.

In step 375, a database of the call processing modules and/or of another system may be updated (supplemented and/or revised) with the information in the request and/or obtained based on the information in the request. For example, statistics regarding bad call requests in general or from the indicated origin may be updated with the information in the request or regarding the request. The information regarding the request may be obtained, for example, from searches of various databases of the call processing modules or of other public or private sources. The information regarding the request may be used as the parameter(s) for the searches.

In step 380, the request may be dropped (e.g., the call may be not connected or be disconnected). The step 380 may be identical, analogous, or similar to the step 280 described above in relation to the method 200 of FIG. 2, and vice versa. The steps 370/375/380, however ordered, may be referred to as steps rejecting the request.

The method may then terminate in flow point 399, and may be repeated as needed or desired, for example, when a new request is received.

If the request has passed the filtering of the step 307 and the decision block 309, the method flow may continue towards decision block 310, in which a determination is made whether the request includes a toll in at least the required predetermined amount.

In examples, the decision block 310 is identical, analogous, or similar to the decision block 210 described above in relation to the method 200 of FIG. 2, and vice versa. If the token is not included or is in insufficient amount or is qualitatively unacceptable (e.g., easily refundable, from a non-participating or blacklisted financial institution), the method flow continues towards the steps 370/375/380, which have already been described. The method may then terminate in the flow point 399, and may be repeated as needed or desired, for example, when a new request is received.

If the token is included, is in a sufficient amount and is qualitatively acceptable, the method flow proceeds towards step 315, where the token is "cashed" in at least the required amount. For example, the funds are transferred into control of the operator/provider of the network or the operator of the service providing the call processing functionality, and/or the account associated with the target. In examples, the step 315 is identical, analogous, or similar to the step 215, and vice versa.

In step 320, the toll is refunded in whole or in part to an account associated with the origin indicated in the request. For a telephone call, for example, the caller ID number may be used to identify the origin of the call. For a conferencing service, the operator of the service may maintain financial accounts for the registered originators. The refund may be made in substantially real time, such as within <10 minutes of the call's completion. But in some embodiments the refund may take longer; preferably, however, the refund is made so that the extra cost of the call is transparent to the caller because the refund offsets (at least partially) the toll.

In examples, this step is identical, analogous, or similar to the step 220 described above in relation to the method 200 of FIG. 2, and vice versa.

In step 325, call filtering may be performed. The step 325 may be identical, analogous, or similar to the step 225 described above in relation to the method 200 of FIG. 2, and vice versa. For example, requests from blacklisted originators are identified. Similarly, requests with other undesirable attributes may be identified, for example, requests from specific countries, area codes, and exchanges; and SIP INVITEs without an attestation or with an attestation level not meeting predetermined criteria. See also the incorporated filtering patents for examples of identifying/filtering of unwanted calls.

In examples, the filtering performed in the step 325 is more stringent than, or otherwise different from, the filtering performed in the step 307.

In decision block 330, further method flow is determined based on whether the request has been identified in the filtering step 325 as an unwanted one. This decision block may be identical, analogous, or similar to the decision block 230 described above in relation to the method 200 of FIG. 2, and vice versa. If the request is determined to be unwanted, the method flow proceeds to the steps 370/375/380, which have already been described. The method may then terminate in the flow point 399, and may be repeated as needed or desired, for example, when a new request is received.

Note that the specific interactions in the step 370 may vary depending on the previous steps/decisions of the process 300. Thus, the specific information/messages conveyed to the originator may be different depending on whether the process flow comes to the step 370 from the decision block 309, from the decision block 310, or from the decision block 330. For example, the information/message (in the step 370) following the decision block 309 may be omitted altogether or it may inform the originator of the reason(s) the request has failed the pre-toll filtering; the message following the decision block 310 may be omitted or it may inform the originator that the toll is missing, insufficient, and/or of unacceptable quality; and the message following the decision block 330 may be omitted or it may inform the originator of the reason(s) the request has failed the post-toll filtering.

In the step 370, the originator may also or instead be offered an opportunity to record a message for the user.

If the request has not being identified as an unwanted one in the step 325 and the decision block 330, the method flow may continue towards step 335, in which the call is connected to the target of the request (the user device being called). The method may then terminate in the flow point 399, and may be repeated as needed or desired, for example, when a new request is received.

Figure 4:
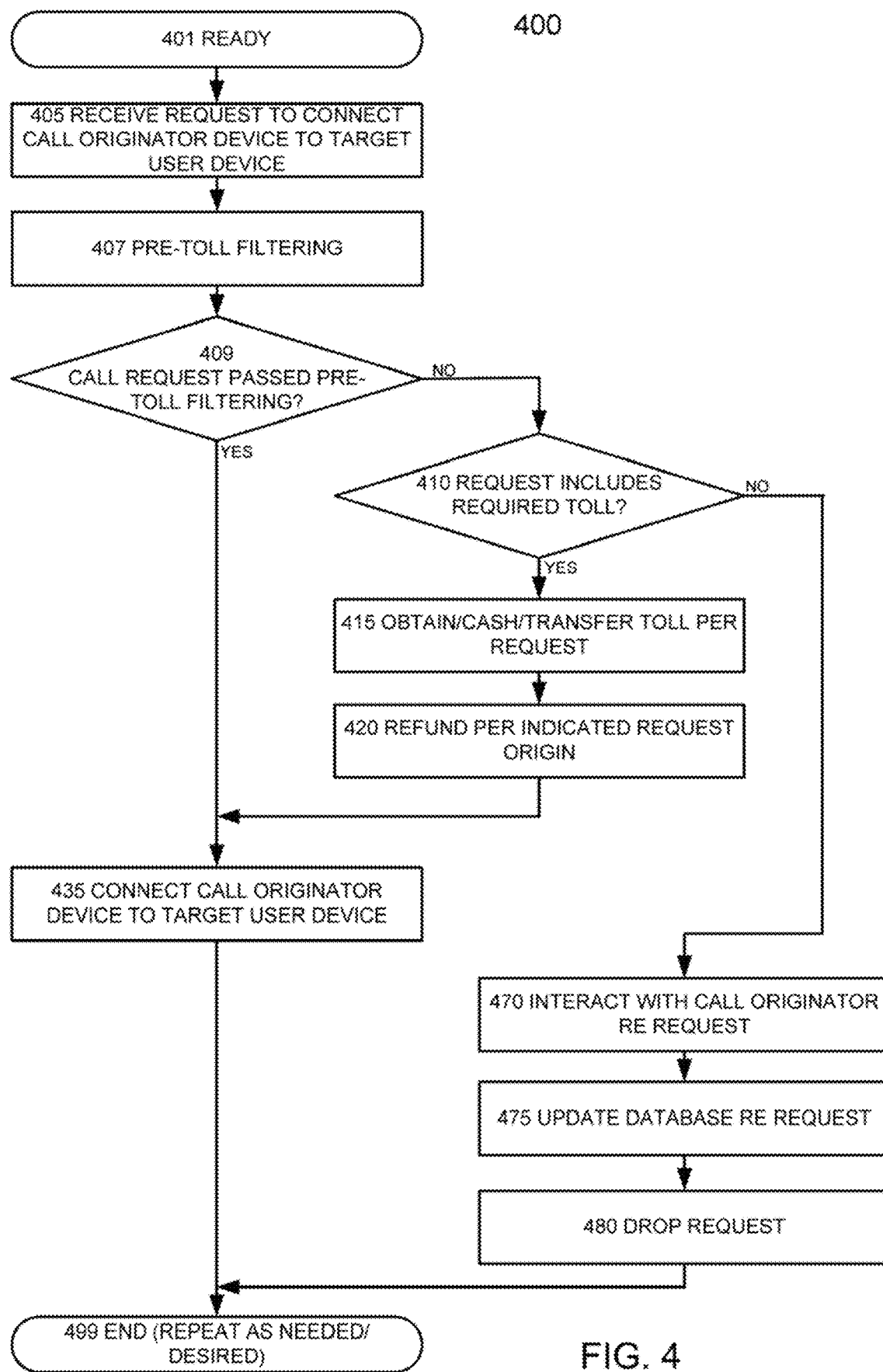
FIG. 4 illustrates selected steps and decision blocks of yet another exemplary method of call processing, in accordance with certain features described in this document.

FIG. 4 illustrates selected steps and decision blocks of yet another exemplary method 400 of operation of the call processing functionality, however the processing module(s) implementing the functionality are distributed and wherever they are located.

At flow point 401, the call processing modules and the network (e.g., the network 105) are powered-up, initialized, and ready to perform the steps of the method 400.

In step 405, a request to connect a call from the call originator (e.g., 146-n) to a target (e.g., 120-n) is received. In examples, this step is identical, analogous, or similar to the steps 205 and 305 described above in relation to, respectively, the method 200 of FIG. 2 and the method 300 of FIG. 3, and rice versa.

In step 407, call filtering may be performed. For example, calls from whitelisted originators are identified, so that there is a relatively high degree of confidence that the request is not an unwanted one such as a robocall, and therefore should be connected to the target user device. This step may be identical, analogous, or similar to the step 307 described above in relation to the method 300 of FIG. 3, and vice versa.

In decision block 409, further method flow is determined based on whether or not the request has passed the filtering in the step 407, for example, originating from a whitelisted number or source. This decision block may be identical, analogous, or similar to the decision block 309 described above in relation to the method 300 of FIG. 3, and vice versa.

If the request passes the filtering in the step 407 and the decision block 409 (e.g., the request is from a whitelisted source), the method flow may advance towards step 435, in which the call is connected to the target. In examples, the step 435 is identical, analogous, or similar to the steps 235 and 335 described above in relation to, respectively, the method 200 of FIG. 2 and the method 300 of FIG. 3, and vice versa. The method may then terminate in flow point 499, and may be repeated as needed or desired, for example, when a new request is received.

If, however, the request does not pass the filtering in the step 407 and the decision block 409, the method flow may continue towards decision block 410, in which a determination is made whether the request includes a toll in at least the required predetermined amount. In examples, the decision block 410 is identical, analogous, or similar to the decision block 210 or the decision block 310 described, respectively, in relation to the method 200 of FIG. 2 and the method 300 of FIG. 3, and vice versa.

If the token is not included or is in insufficient amount or is qualitatively unacceptable (e.g., easily refundable, from a non-participating or blacklisted financial institution), the method flow continues towards step 470, where some interaction between the originator and the processing modules may take place. For example, the originator may be informed that the target will not answer the call. Other information may also be conveyed to the originator. Additionally, the originator may be offered an opportunity to record a message for the target or another entity. In examples, the step 470 is identical, analogous, or similar to the step 370 described above in relation to the method 3M) of FIG. 3, and vice versa.

In step 475, a database of the modules or of another system may be updated (supplemented and/or revised) with the information in the request and/or obtained based on the information in the request. For example, statistics regarding bad call requests in general or from the indicated origin may be updated with the information in the request or regarding the request. The information regarding the request may be obtained, for example, from searches of various databases of the modules or of other public or private sources. The information regarding the request may be used as the parameter(s) for the searches. In examples, the step 475 is identical, analogous, or similar to the step 375 described above in relation to the method 300 of FIG. 3, and vice versa.

In step 480, the request may be dropped (e.g., the call may be not connected or be disconnected). This step may be identical, analogous, or similar to the steps 280 and 380 described above in relation to, respectively, the method 200 of FIG. 2 and the method 300 of FIG. 3, and vice versa.

The steps 470/475/480 may be referred to as rejecting the request.

If the token is included in a sufficient amount and is qualitatively acceptable, the method flow may proceed from the decision block 410 towards step 415, where the token is "cashed" in at least the required amount. For example, the funds are transferred into control of the operator/provider of the network or the operator of the service providing the call processing functionality, and/or the account associated with the target. In examples, the step 415 is identical, analogous, or similar to the steps 215 and 315 described above in relation to, respectively, the method 200 of FIG. 2 and the method 300 of FIG. 3, and vice versa.

In step 420, the toll is refunded in whole or in part to an account associated with the indicated origin in the request. For a telephone call, for example, the caller ID number may be used to identify the origin of the call. For a conferencing service, the operator of the service may maintain financial accounts for the registered originators. The refund may be made in substantially real time, such as within <10 minutes of the call's completion. But in some embodiments the refund may take longer; preferably, however, the refund is made so that the extra cost of the call is transparent to the caller because the refund offsets (at least partially) the toll. In examples, this step is identical, analogous, or similar to the steps 220 and 320 described, respectively, in relation to the method 200 of FIG. 2 and the method 300 of FIG. 3, and vice versa.

The method may then terminate in flow point 499, and may be repeated as needed or desired, for example, when a new request is received.

Figure 5A:
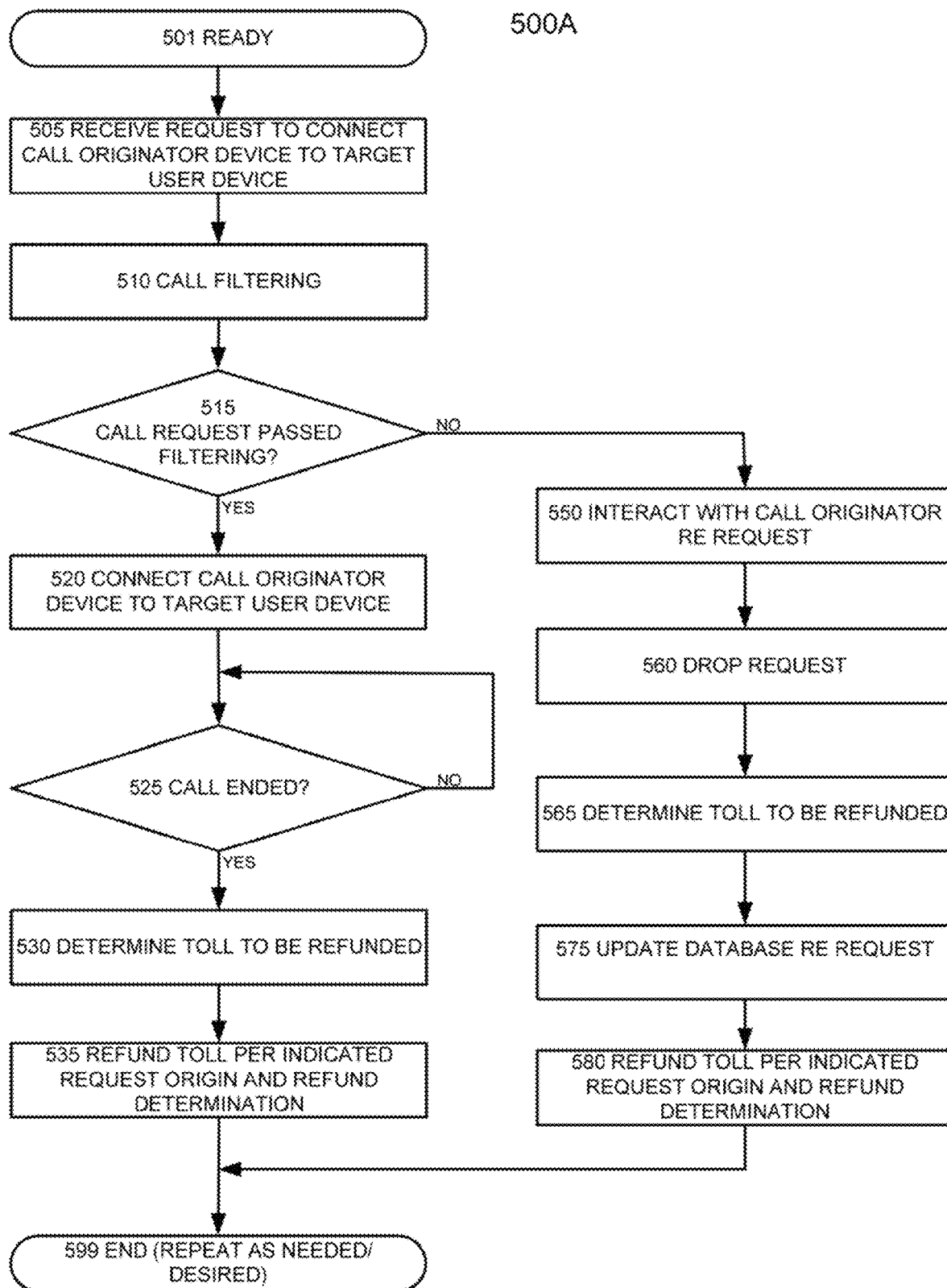
FIG. 5A illustrates selected steps and decision blocks of still another exemplary method of call processing, in accordance with certain features described in this document.

FIG. 5A illustrates selected steps and decision blocks of another exemplary method 500A of operation of the call processing functionality, however the processing module(s) implementing the functionality are distributed and wherever they are located. Here, the target's telephone number is an extra cost telephone number.

At flow point 501, the call processing modules and the network (e.g., the network 105) are powered-up, initialized, and ready to perform the steps of the method 500A; and the target's telephone number has been configured/provisioned as an extra cost telephone number.

In step 505, a request to connect a call from the call originator (e.g., 146-n) to a target (e.g., 120-n) is received. In examples, this step is identical, analogous, or similar to the steps 205/305/405 described above in relation to the methods 200/300/400, and vice versa. If the request is a SIP INVITE within the STIR/SHAKEN framework, it may include a P-Asserted-Identity field for an attestation level parameter, for example, in its header.

In step 510, call filtering may be performed. For example, calls from whitelisted originators are identified, so that there is a relatively high degree of confidence that the request is not an unwanted one such as a robocall. This step may be identical, analogous, or similar to the steps 225, 307, 325, and 407 described above in relation to the methods 200/300/400 of FIGS. 2-4, and vice versa. Further, if the request is a SIP INVITE in the STIR/SHAKEN framework, the attestation level parameter may be examined.

In decision block 515, further method flow is determined based on whether or not the request has passed the filtering in the step 510, for example, originating from a whitelisted number or source. This decision block may be identical, analogous, or similar to the decision blocks 230/309/409 described above in relation to the methods 200/300/400, and vice versa. Further, if the request is a SIP INVITE in the STIR/SHAKEN framework, if the attestation level parameter is missing or showing an insufficient/unacceptable trust level, the call may be considered to have failed the call filtering. The user/target may have previously preset the acceptable attestation level(s).

If the request passes the filtering in the step 510 and the decision block 515 (e.g., the request is from a whitelisted source), the method flow may advance to step 520, in which the call is connected to the target. In examples, the step 520 is identical, analogous, or similar to the steps 235/335/435 described above in relation to, respectively, the methods 200/300/400 (and vice versa).

The call's duration is monitored in the loop created by decision block 525. When the call ends, the toll charge for the call is determined in step 530, the charge may depend on the duration of the call, or be independent of the duration, for example, if the extra cost of the extra cost telephone number is a connection charge rather than a charge per unit of time. The toll charge here may be the amount that is known or expected to be charged to the originator of the call due to the target's number being an extra cost telephone number, by, for example, the service provider of the call originator.

In step 535, the toll is refunded in whole or in part to an account associated with the indicated origin in the request. In examples, this step is identical, analogous, or similar to the steps 220/320/420 described in relation to the methods 200/300/400 (and vice versa). The refund may be made in substantially real time, such as within <10 minutes of the call's completion. But in some embodiments the refund may take longer; preferably, however, the refund is made so that the extra cost of the call is transparent to the target because the refund offsets (at least partially) the extra cost resulting from the use of the extra cost telephone number, for example, within the same billing period of the caller. In examples, this step is identical, analogous, or similar to the steps 220/320/420 described above, and vice versa.

The method may then terminate in flow point 599, and may be repeated as needed or desired, for example, when a new request is received.

Returning now to the decision block 515, if the request does not pass the filtering, the method flow may proceed towards steps 550, 560, 565, 575, and 580.

In the step 550, some interaction between the originator and the processing modules may take place. For example, the originator may be informed that the target will not answer the call. Other information may also be conveyed to the originator. Additionally, the originator may be offered an opportunity to record a message for the target or another entity. In examples, the step 550 is identical, analogous, or similar to the steps 370/470 described in relation to the methods 300/400 (and vice versa).

Once the interaction ends, the call may dropped in the step 560, e.g., the call may be not connected or be disconnected. (The call may be dropped first on the other side, by the originator-caller.) The step 560 may be identical, analogous, or similar to the steps 280/380/480 described above in relation to the methods 200/300/480 (and vice versa).

The toll charges for the call are determined in step 565, which may be identical, similar, or analogous to the step 530 described above.

In the step 575, a database of the modules or of another system may be updated (supplemented and/or revised) with the information in the request and/or obtained based on the information in the request. In examples, this step is identical, analogous, or similar to the steps 375/475 described above in relation to the methods 300/400 (and vice versa).

In the step 580, the toll is refunded in whole or in part to an account associated with the indicated origin in the request. In examples, this step is identical, analogous, or similar to the step 535.

The method may then terminate in flow point 599, and may be repeated as needed or desired, for example, when a new request is received.

Figure 5B:
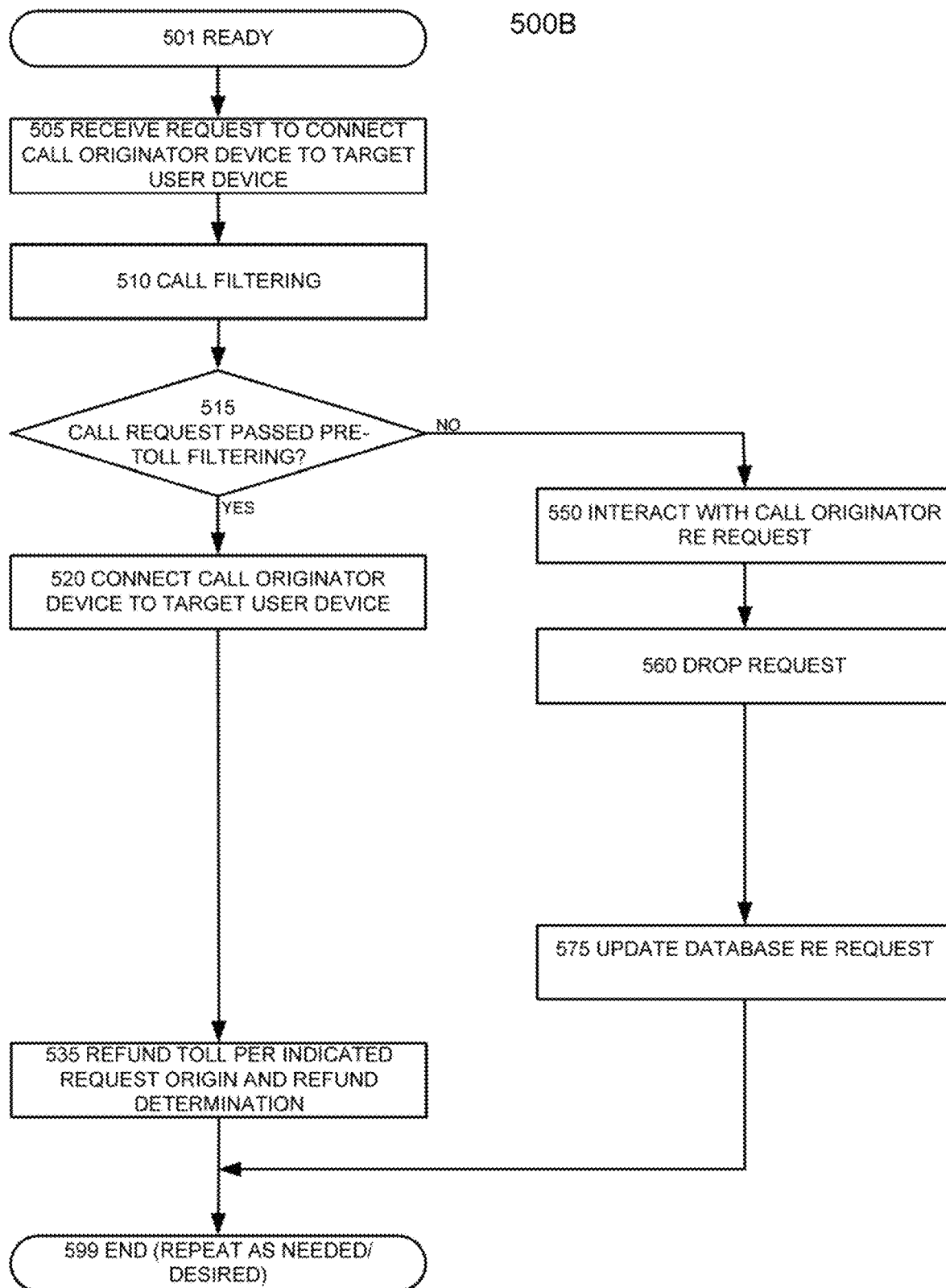
FIG. 5B illustrates selected steps and decision blocks of still another exemplary method of call processing, in accordance with certain features described in this document.

FIG. 5B illustrates selected steps and decision blocks of method 5B, which is similar to the method 5A. Here, however, the toll is not computed. Computing the toll may not be necessary where the toll is a connection charge, independent or largely independent of the call's duration. Further, no refund of the toll is made if the call request does not pass the filtering of the step 510 and the decision block 515. The steps and decision block of the method 5B have already been described in relation to the method 5A.

Figure 6:
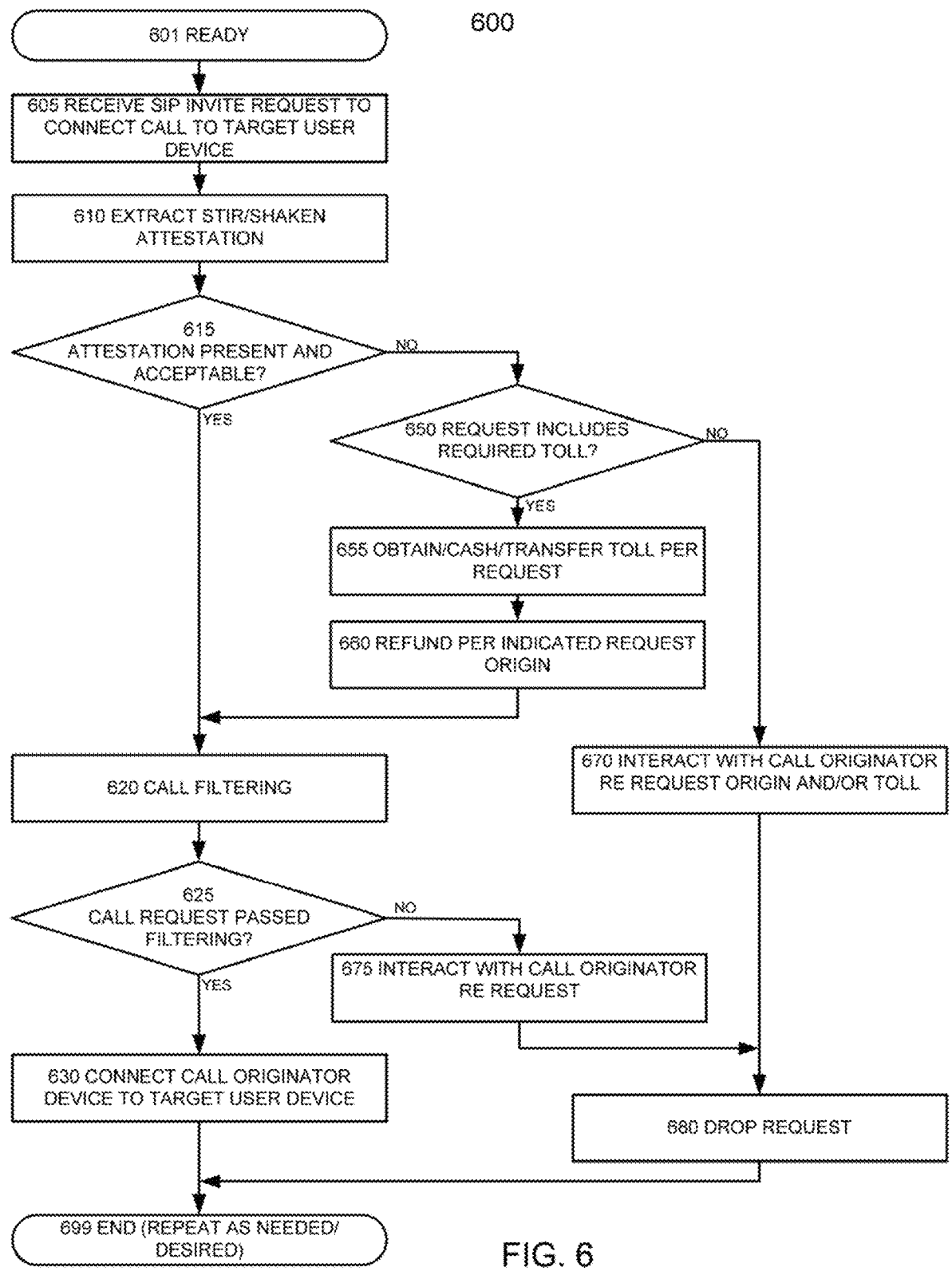
FIG. 6 illustrates selected steps and decision blocks of still another exemplary method of call processing in accordance with certain features described in this document.

FIG. 6 illustrates selected steps and decision blocks of an exemplary method 600 of operation of the call processing functionality within a STIR/SHAKEN framework.

At flow point 601, the processing modules and the network are powered-up, initialized, and ready to perform the steps of the method 600.

In step 605, a SIP INVITE request to connect a call from the call originator (e.g., 146-*n*) to a target (e.g., 120-*n*) is received. In examples, the SIP INVITE is received by a VoIP server of the carrier of the target user device, or another server. In other examples, the SIP INVITE is received by a specialized app executing on the target user device.

In step 610, the STIR/SHAKEN attestation in the header of the SIP INVITE is extracted, if the attestation is present.

In decision block 615, a determination is made whether the attestation is present in the SIP INVITE, and if present, whether the attestation indicates that the source of the SIP INVITE is reliable and the origin of the SIP INVITE is not misrepresented (whether the attestation is acceptable). An interaction with the Certificate Authority 182 may need to take place for this determination to be made.

If the attestation is present and is acceptable, the process flow proceeds towards step 620, where call filtering is performed on the SIP INVITE, and then towards decision block 625 in which it is determined whether the SIP INVITE has passed the filtering. These steps may be identical, similar, or analogous to the steps/decision blocks 225/230 of the method 200; 307/309 of the method 300; 325/330 also of the method 300; 407/409 of the method 400; and 510/515 of the methods 500A/500B (and vice versa). In examples, the SIP INVITE passes this filtering if its origin (such as a caller ID) is whitelisted, and fails if the origin is blacklisted.

If the SIP INVITE passes the filtering, the process flow may proceed towards step 630, in which the call is connected to the target. In examples, the step 630 is identical, analogous, or similar to the steps 235/335/435/520 described above (and vice versa). The method may then terminate in flow point 699, and may be repeated as needed or desired, for example, when a new SIP INVITE request is received.

If the SIP INVITE does not pass the filtering, the process flow may proceed towards step 675, where some interaction with the originator may take place. For example, the originator may be informed that the target will not answer the call. Other information may also be conveyed to the originator, and an opportunity to record a message for the target or another entity may be offered to the originator. In examples, the step 675 is identical, analogous, or similar to the steps 370/470/550 described above (and vice versa). The request may be dropped in step 680, which may be identical, analogous, or similar to the steps 280/380/480/560 described above (and vice versa).

Returning to the decision block 615, if the attestation is absent or not acceptable, the method flow may proceed towards decision block 650, which determines whether the SIP INVITE request includes a toll in at least the required predetermined amount. In examples, the decision block 650 is identical, analogous, or similar to the decision blocks 210/310/410 described above (and vice versa). In examples, however, the toll may be requested from the originator in a message sent from the call processing functionality in response to the SIP INVITE; in still other examples, the toll may be received in additional message associated with the SIP INVITE and received at the same or substantially same time as the SIP INVITE. If the toll in the at least predetermined amount has been received or is received within some predetermined time period (e.g., <10 minutes, <1 minutes, <30 seconds, <10 seconds), the decision in the decision block 650 may be in the affirmative and the method flow may proceed towards step 655, where the token is "cashed" in at least the required amount. For example, the funds are transferred into control of the operator/provider of the network or the operator of the service providing the call processing functionality, and/or the account associated with the target. In examples, the step 655 is identical, analogous, or similar to the steps 215/315/415 which have already been described above (and vice versa). The toll is refunded, in step 660. The toll may be refunded in whole or in part to an account associated with the indicated origin in the request, such as the caller ID of the SIP INVITE. In examples, this step is identical, analogous, or similar to the steps 220/320/420 described above (and vice versa). The process flow then proceeds towards the step 620, and continues from there as has already been described.

If the toll is not included (or not received within the predetermined period as is described in the immediately preceding paragraph), is in insufficient amount or is qualitatively unacceptable (e.g., easily refundable, from a non-participating or blacklisted financial institution, is in the form of undesirable cryptocurrency), the method flow may continue towards step 670, where some interaction between the originator and the processing modules may take place. For example, the originator may be informed via voice or text that the target will not answer the call. Other information may also be conveyed to the originator. Additionally, the originator may be offered an opportunity to record a message for the target or another entity. In examples, the step 670 is identical, analogous, or similar to the steps 370/470/550 described above (and vice versa); the step 670 may also be identical to the step 675, or the steps 670 and 675 of this method may differ from each other.

The request may then be dropped, in the step 680, which may be identical, analogous, or similar to the steps 280/380/480/560 described above in relation to the methods 200/300/480/500A (and vice versa).

The features described throughout this document and all the incorporated documents may be present individually, or in any combination or permutation, except where the presence or absence of specific features (elements, steps/decisions, limitations) is inherently required, explicitly indicated, or otherwise made clear from the description. This applies whether or not features appear related to specific embodiments; thus, features of the different described embodiments may be combined.

Although the method steps and decisions (if decision blocks are present) may be described serially in this document, certain steps and/or decisions may be performed by same and/or separate elements in conjunction or in parallel, asynchronously or synchronously, in a pipelined manner, or otherwise. There is no particular requirement that the steps and decisions be performed in the same order in which this description lists them or the Figures show them, except where a specific order is inherently required, explicitly indicated, or is otherwise made clear from the context. Furthermore, not every illustrated step and decision block may be required in every embodiment in accordance with the concepts described in this document, while some steps and decision blocks that have not been specifically illustrated may be desirable or necessary for proper operation in some embodiments in accordance with the concepts. It should be noted, however, that specific embodiments/variants/implementations/examples use the particular order(s) in which the steps and decision blocks (if applicable) are shown and/or described.

The instructions (machine executable code) corresponding to the method steps of the embodiments, variants, implementations, and examples disclosed in this document may be embodied directly in hardware, in software, in firmware, or in combinations thereof. A software/firmware module may be stored in volatile memory, flash memory. Read Only Memory (ROM). Electrically Programmable ROM (EPROM), Electrically Erasable Programmable ROM (EEPROM), hard disk, a CD-ROM, a DVD-ROM, or other forms of non-transitory storage medium known in the art. Exemplary storage medium or media may be coupled to one or more processors so that the one or more processors can read information from, and write information to, the storage medium or media. In an alternative, the storage medium or media may be integral with one or more processors.

The processing modules described in this document may be implemented using cloud computing.

This document describes in detail the inventive apparatus, methods, and articles of manufacture for processing requests for connecting/transmitting calls, such as filtering, blocking, connecting, and dropping call requests. This was done for illustration purposes and, therefore, the foregoing description is not necessarily intended to limit the spirit and scope of the invention(s) described. Neither the specific embodiments of the invention(s) as a whole, nor those of its (or their, as the case may be) features necessarily limit the general principles underlying the invention(s). The specific features described herein may be used in some embodiments, but not in others, without departure from the spirit and scope of the invention(s) as set forth herein. Various physical arrangements of components and various step sequences also fall within the intended scope of the invention(s). Many additional modifications are intended in the foregoing disclosure, and it will be appreciated by those of ordinary skill in the pertinent art that in some instances some features may be employed in the absence of use of other features. The embodiments described above are illustrative and not necessarily limiting, although they or their selected features may be limiting for some claims. The illustrative examples therefore do not necessarily define the metes and bounds of the invention(s) and the legal protection afforded the invention(s).

I claim:

1. A method of processing call requests, the method comprising steps of:
receiving a plurality of requests from one or more originators to connect audio or video calls to one or more user devices of one or more users;
for each request of the plurality of requests:
determining whether the request includes a value token that meets all of one or more acceptability requirements, the one or more acceptability requirements comprising a first requirement of the value token having a value of at least a predetermined amount;
rejecting the request if the request does not include the value token that meets all of the one or more acceptability requirements, the step of rejecting comprising dropping the request;
if the request includes the value token that meets all of the one or more acceptability requirements,
obtaining via a first electronic transaction the predetermined amount of the value token so that the originator of the request is not in control of the predetermined amount of the value token,
crediting via a second electronic transaction at least a portion of the predetermined amount to an account associated with call origin indicated in the request, if the request indicates the call origin, and
connecting the call corresponding to the request;
whereby connection of a spoofed call costs an originator of request to connect the spoofed call more than connection of a non-spoofed call costs an originator of request to connect the non-spoofed call.

2. The method of claim 1, wherein the step of rejecting further comprises attempting to interact with an originator of the request.

3. The method of claim 2, wherein the step of attempting to interact comprises at least one step selected from the group consisting of conveying a message to the originator of the request and recording a message from the originator of the request.

4. The method of claim 2, wherein:
the value of the token is pecuniary; and
the one or more acceptability requirements further comprise a second requirement of the value token being of acceptable quality.

5. The method of claim 2, wherein:
the value of the token comprises pecuniary value; and
the one or more acceptability requirements further comprise a requirement of the value token being non-refundable.

6. The method of claim 1, further comprising:
filtering the request based on at least one characteristic of the request.

7. The method of claim 6, wherein the step of filtering is performed before or concurrently with the step of determining.

8. The method of claim 6, wherein the step of filtering is performed after or concurrently with the step of determining.

9. The method of claim 6, further comprising:
maintaining a list of caller IDs from which call requests are not to be connected:
wherein:
the at least one characteristic comprises caller ID of the request; and
the step of filtering comprises determining whether the caller ID of the request is included on the list, wherein the request does not pass the step of filtering if the caller ID of the request is on the list.

10. The method of claim 6, further comprising:
maintaining a list of caller IDs from which call requests are to be connected;
the at least one characteristic comprises caller ID of the request; and
the step of filtering comprises determining whether the caller ID of the request is on the list, wherein the request passes the step of filtering if the caller ID of the request is on the list.

11. The method of claim 6, wherein:
the request comprises a Session Initiation Protocol (SIP) INVITE; and
the step of filtering comprises attempting to extract a STIR/SHAKEN attestation from the SIP INVITE and filtering based on presence or absence of the attestation in the SIP INVITE and level of the attestation.

12. The method of claim 6, wherein the step of filtering is performed after the steps of obtaining the predetermined amount and crediting.

13. A method of processing call requests, comprising steps of:
receiving a request to connect a call to an extra cost telephone number of a user device of a user, from an originator of the request;
connecting the call to enable the user to answer the call through the user device;
determining extra cost of the call to the originator due to the extra cost telephone number of the user device;
extracting caller origin indicated in the request; and
crediting via an electronic transaction at least a portion of the extra cost of the call to an account associated with call origin indicated in the request.

14. The method of claim 13, wherein the call is spoofed and the step of crediting comprises crediting the extra cost of the call to the account associated with call origin indicated in the request.

15. The method of claim 13,
wherein the call is a non-spoofed voice call;
the step of crediting is performed within less than 10 minutes of completion of the call and the at least portion of the extra cost of the call comprises the extra cost of the call to make the extra cost of the call transparent to the originator;
the method further comprising:
filtering the request based on at least one characteristic of the request.

16. The method of claim 15, wherein:
the request comprises a Session Initiation Protocol (SIP) INVITE comprising an identity header, the identity header comprising a calling number field and a STIR/SHAKEN attestation field;
the step of filtering comprises attempting to extract an attestation from the STIR/SHAKEN attestation field and a calling number from the calling number field; and
the step of filtering is based on the attestation.

17. The method of claim 16, wherein the request fails the step of filtering if the attestation is not Full Attestation.

18. The method of claim 16, wherein the request fails the step of filtering if the attestation is not Full Attestation and not Partial Attestation.

19. A method of processing call requests, the method comprising steps of:
receiving a request to connect a video or audio call to a user device of a user, from an originator of the request, the request comprising a Session Initiation Protocol (SIP) INVITE;
determining whether the request contains an acceptable STIR/SHAKEN attestation;
if the request contains an acceptable STIR/SHAKEN attestation, filtering the request based on at least one characteristic of the request;
if the request passes the step of filtering, connecting the call to enable the user to answer the call through the user device;
if the request fails the step of filtering, performing rejection of the request;
if the request does not contain an acceptable STIR/SHAKEN attestation, determining whether the request includes a value token that meets all of one or more acceptability requirements, the one or more acceptability requirements comprising a first requirement of the value token having a value of at least a predetermined amount;
if the request does not contain an acceptable STIR/SHAKEN attestation and the request does not include a value token that meets all of the one or more acceptability requirements, performing rejection of the request;
if the request does not contain an acceptable STIR/SHAKEN attestation and the request includes a value token that meets all of the one or more acceptability requirements,
obtaining via a first electronic transaction the predetermined amount of the value token so that the originator of the request is not in control of the predetermined amount of the value token,
crediting via a second electronic transaction at least a portion of the predetermined amount to an account associated with call origin indicated in the request, if the request indicates the call origin, and
connecting the call to enable the user to answer the call through the user device; whereby connecting the call in response to the request that does not contain an acceptable STIR/SHAKEN attestation and includes a value token that meets all of the one or more acceptability requirements costs the originator more when the call is spoofed than when the call is non-spoofed.

20. The method of claim 19, wherein:
the call is a telephone call;
Partial Attestation and Gateway Attestation are not acceptable attestations;
the step of filtering comprises
at least one step selected from the group consisting of a step for blacklist filtering and a step for whitelist filtering; and
rejection of the request comprises (i) at least one step selected from the group consisting of conveying a message to the originator of the request and recording a message from the originator of the request, and (ii) dropping the request.

* * * * *

UNITED STATES PATENT AND TRADEMARK OFFICE
CERTIFICATE OF CORRECTION

PATENT NO. : 11,665,277 B2
APPLICATION NO. : 17/179230
DATED : May 30, 2023
INVENTOR(S) : Anatoly S. Weiser It is certified that error appears in the above-identified patent and that said Letters Patent is hereby corrected as shown below:

In the Specification

Column 2, Line 52, cancel "Full Attestation. Partial Attestation." and replace with --Full Attestation, Partial Attestation,--;

Column 5, Line 65, cancel "internet" and replace with --Internet--;

Column 6, Line 36, cancel "el al.," and replace with --et al.,--;

Column 6, Line 52, cancel "caller II)" and replace with --caller ID--;

Column 6, Line 66, cancel "Full Attestation." and replace with --Full Attestation,--;

Column 14, Line 47, cancel "3M)" and replace with --300--;

In the Claims

Column 20, Line 51, in Claim 9, cancel "connected:" and replace with --connected;--.

Signed and Sealed this
First Day of August, 2023

*Katherine Kelly Vidal*

Katherine Kelly Vidal
*Director of the United States Patent and Trademark Office*